United States Patent [19]

Normile et al.

[11] Patent Number: 5,541,995
[45] Date of Patent: Jul. 30, 1996

[54] METHOD AND APPARATUS FOR DECODING NON-SEQUENTIAL DATA PACKETS

[75] Inventors: James O. Normile, Woodside; Ke-Chiang Chu, Saratoga, both of Calif.

[73] Assignee: Apple Computer Inc., Cupertino, Calif.

[21] Appl. No.: 228,725

[22] Filed: Apr. 18, 1994

[51] Int. Cl.$^6$ ............................ H04L 9/18; H04L 9/20
[52] U.S. Cl. ............................ 380/42; 380/46; 380/48; 380/50
[58] Field of Search ............................ 380/42, 43, 50, 380/46, 48

[56] References Cited

U.S. PATENT DOCUMENTS

| | | | |
|---|---|---|---|
| 4,710,921 | 12/1987 | Ishidoh et al. | 380/43 X |
| 4,788,543 | 11/1988 | Rubin | 380/50 X |
| 5,161,189 | 11/1992 | Bray et al. | 380/21 |
| 5,303,302 | 4/1994 | Burrows | 380/49 |
| 5,345,508 | 9/1994 | Lynn et al. | 380/50 X |

FOREIGN PATENT DOCUMENTS

| | | |
|---|---|---|
| 5056079 | 3/1993 | Japan. |
| 9326109 | 12/1993 | WIPO. |

OTHER PUBLICATIONS

Bidzos, D. James and Kaliski Jr., Burt S., "An Overview of Cryptography", LAN Times Feb., 1990.

Blahut, Richard E., "Digital Transmission of Information", Chapter 12.6, first para., Addison–Wesley Publishing Company, Jul. 9, 1993.

Blahut, Richard E., "Digital Transmission of Information", Chapter 12.7, Addison–Wesley Publishing Company, Jul. 9, 1993.

Sklar, Bernard, "Digital Communications: Fundamentals and Applications", Chapter 12.4 introduction, p. 694, Prentice Hall Publishers, 1988.

Kaliski, Burt, "Packet Encryption" RSA Laboratories, Slides 1,3,5,7,9,11,13,15,17, Jan. 22, 1992.

*Primary Examiner*—Gilberto Barrón, Jr.
*Attorney, Agent, or Firm*—Carr, DeFilippo & Ferrell

[57] ABSTRACT

Data packets which have been sequentially encoded and transmitted, and are received out-of-sequence, are decoded, such that the proper sequence is restored. A receiving decoder is synchronized with a transmitting encoder and generates a sequence of decoding data corresponding to the sequence used to encode the data. The decoding data is combined with the received encoded data to produce the original dam. The decoded data is then stored in message-sequence in a memory. When packet network routing results in the encoded data being received out-of-sequence, a portion of the generated sequence of decoding data corresponding to packets that have not been received is saved in a memory. When the out-of-sequence packet of encoded data is received, the stored portion of the decoding data is retrieved from memory and is combined with the packet data to produce the decoded data, which is then stored in message sequence. In a preferred embodiment, the memories for the decoding data and the stored decoded data are combined and the portion of the decoding data for the packet of unreceived encoded data occupies the memory position reserved for this unreceived data. When this data is received, it is decoded using the stored decoding data and the decoded result replaces the previously unused decoding data in the memory. The invention permits the decoder to be synchronized with the encoder and to generate its sequence of decoding data without regard to the order in which the encoded data packets are received.

18 Claims, 10 Drawing Sheets

METHOD AND APPARATUS FOR DECODING NON-SEQUENTIAL DATA PACKETS

RELATED APPLICATIONS

The subject matter of this application is related to the subject matter of the following co-pending and commonly assigned applications which are incorporated by reference herein:

1) Ser. No. 08/110,402 entitled "Method and Apparatus for Variable Overhead Cached Encryption" filed Aug. 23, 1993;
2) Ser. No. 08/184,978, entitled "Method and Apparatus for Improving the Security of an Electronic Codebook Encryption Scheme Utilizing an Offset in the Pseudorandom Sequence" filed Jan. 21, 1994; and
3) Ser. No. 08/193,248, entitled "Method and Apparatus for Improving the Security of an Electronic Codebook Encryption Scheme Utilizing a Data Dependent Encryption Function" filed Feb. 8, 1994.

BACKGROUND OF THE INVENTION

1. Field of the Invention

This invention relates to digital data communication, and more particularly to an improved ,method and apparatus for encoding and decoding packet switching communication to provide improved efficiency in processing non-sequentially transmitted data packets.

2. Description of the Background Art

Data encoding and decoding are functions that ensure the privacy of a digital communication by preventing an unauthorized receiver from understanding the contents of a transmitted message. Examples of encoding include encrypting plaintext data into ciphertext using an invertable encryption function, compressing plaintext data by adding compression codes or equations, and altering plaintext data via an invertable mathematical algorithm. Decoding is the inverse of encoding and includes decrypting encoded data to recover the original plaintext data, or decompressing compressed data by applying a decompressing code or equation to regain the full data string.

U.S. patent application Ser. No. 08/110,402 entitled "Method and Apparatus for Variable Overhead Cached Encryption" filed Aug. 23, 1993 discloses a digital encryption structure that allows the computational overhead associated with digital encryption to be varied by selectively reusing a pseudorandom encoding sequence at the transmitter end and by storing and reusing pseudorandom decoding sequences at the receiver end.

Ser. No. 08/184,978, entitled "Method and Apparatus for Improving the Security of an Electronic Codebook Encryption Scheme Utilizing an Offset in the Pseudorandom Sequence" filed Jan. 21, 1994 addresses utilizing a randomly generated offset in the pseudorandom encoding sequence to vary the starting point at which the pseudorandom encoding sequence is combined with the plaintext data to produce the ciphertext.

Ser. No. 08/193,248, entitled "Method and Apparatus for Improving the Security of an Electronic Codebook Encryption Scheme Utilizing a Data Dependent Encryption Function" filed Feb. 8, 1994 improves upon the security of an electronic codebook encryption scheme by further including a mapping table in the encoder. A byte of ciphertext and a random number byte associated with each byte of plaintext data are exchanged to change the relationships within the mapping table. An inverse mapping table, a table that is the inverse of the encoder's mapping table, is included in the receiver. Imported encrypted communication is separated and exchanged in the inverse mapping table to produce unencrypted plaintext data identical to that originally encoded.

Generally, in the conventional processing of packet switching communication, encoded data packets are transmitted through a packet switching network to a receiver where they are received and stored in a memory. When all available encoded data packets are received, the receiver first sorts the stored packets into sequential order and then decodes them in a second step. The decoded packets are then exported to an intended receiver.

Figure 1:
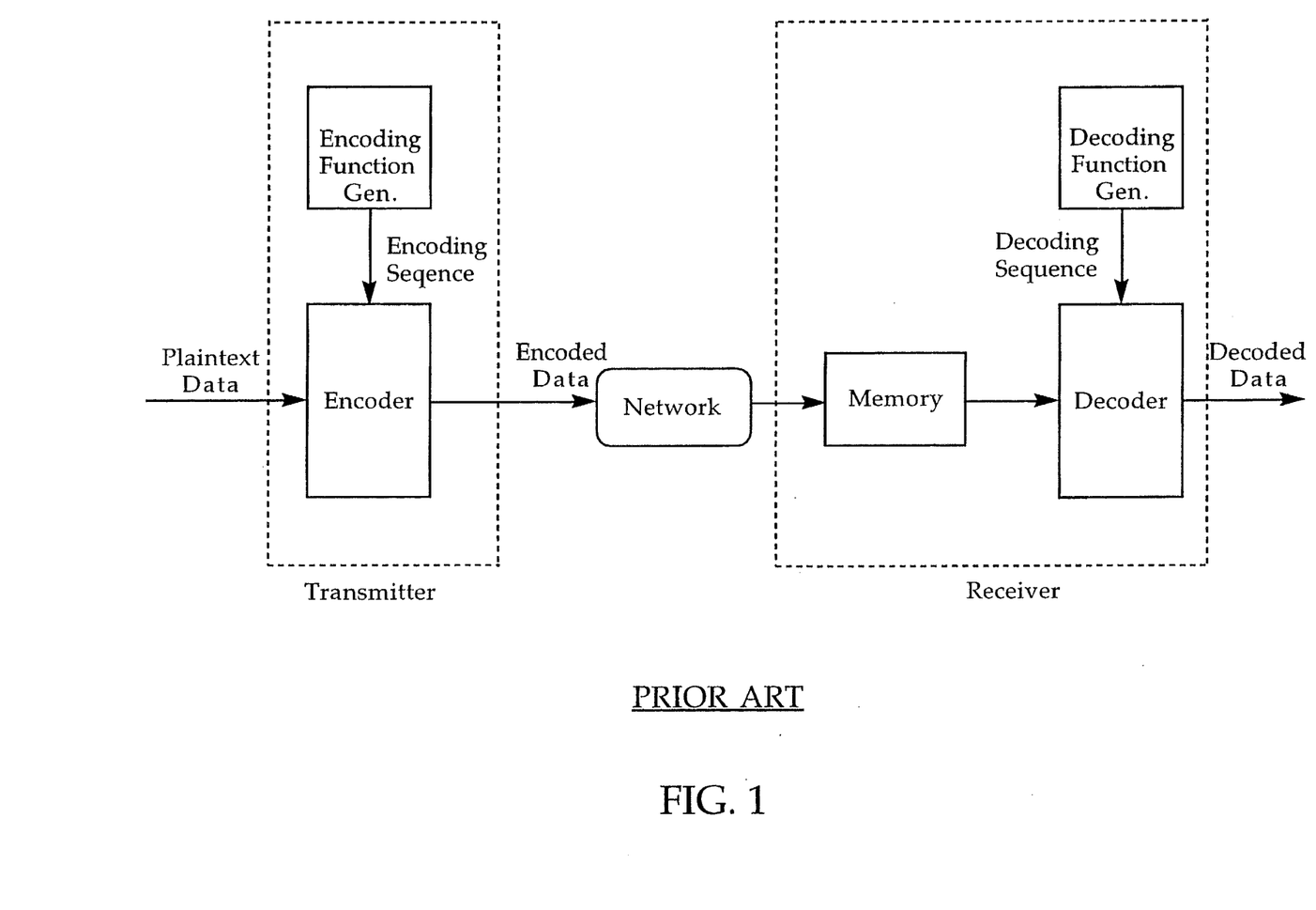
FIG. 1 is a block diagram showing an encoding and decoding system of the prior art.

Referring now to FIG. 1, a diagram is shown of a typical prior art system for encoding and decoding streamlined, sequentially transmitted data. In the system of FIG. 1, a transmitter receives and encodes sequences of plaintext data and transmits the encoded data through a packet switching network to a receiver where the data is decoded. Plaintext data is commonly divided up into data packets, with each data packet consisting of a portion of the plaintext data sequence. The transmitter is comprised of an encoding function generator and an encoder, where the encoding function generator provides an encoding sequence or encoding function to the encoder. In a streaming mode, the plaintext data is received as data packets by the encoder and is there combined with the encoding sequence to produce encoded data. The resultant encoded packets are then transmitted to the receiver through the packet switching network, where they are decoded using a method that is the inverse of that used for data encoding by the transmitter. As the packets travel through the network, the encoded packets travel individually along many different paths. Thus, not all of the encoded packets will reach the receiver at the same time or in the original streaming mode sequence. The receiver is comprised of a memory, a decoding function generator and a decoder. The receiver imports the encoded packets from the network and first stores the encoded packets in the memory. Each encoded packet is placed in the memory storage in its arranged position with respect to the sequential order of the encoded data. When all available encoded packets are received, they are then processed by the decoder. The sequentially ordered encoded data packets are combined in the decoder with a decoding sequence from the decoding function generator to produce decoded data which is the same as the originally encoded plaintext data. The decoded data is then exported from the receiver.

In the conventional decoding process of the prior art, the encoded data packets imported by the receiver are first stored and sorted in the memory. Decoding of the stored packets does not commence until all of the packets have been received and sorted. Storing the imported encoded packets in the memory prior to decoding causes an undesirable delay in the final transmission of the data to the intended receiver. Another drawback of the conventional processing scheme is that, because the encoded packets are stored in the receiver's memory prior to being decoded, a very large memory is required in order to process long messages.

What is needed is a packet switching communication system that decodes and exports encoded data as soon as the data is received, without the need for extensive data storage and unnecessary delay.

SUMMARY OF THE INVENTION

In accordance with the present invention, an apparatus and method are described for promptly processing encoded, non-sequentially received data packets without using a large memory. A transmitter, used for encoding plaintext data to produce encoded data, comprises an encoding function generator and an encoder. Encoding is accomplished by combining the plaintext data with an encoding function within the transmitter. A string of plaintext data is divided up into packets and transmitted in sequential order to the encoder. In a streaming mode, the encoding function generator provides an invertable sequence of numbers, codes or variables (encoding sequence) that is divided into packets and is transmitted to the encoder. The encoding sequence packets and plaintext data packets are combined in the encoder, preferably an XOR gate, to produce encoded data packets. An unauthorized receiver can not readily decipher the encoded data packets.

The transmitter exports the encoded data packets through the packet switching network to a receiver, which comprises a decoding function generator, a decoder and a memory. The decoding function generator produces packets of decoding sequence identical to the encoding sequence of the encoding function generator. As soon as the encoded data packets are imported by the receiver, they are combined with decoding sequence packets generated via a decoding function within the receiver. The combination of the encoded data packets and decoding sequence packets within an XOR gate produces packets of decoded data that are promptly exported. The packets of decoded data are identical to the plaintext data packets originally encoded by the transmitter. A memory is provided for storing decoding sequence packets for which a corresponding encoded data packet has yet to be received as well as any non-sequential decoded data packets output from the XOR gate.

Where a packet of encoded data is missing from the imported stream of encoded data, the decoding sequence packet corresponding to the missing encoded data packet is generated and stored in the memory, because the decoding sequence packets must be generated in sequential order. The decoding sequence packet is stored consecutively within the decoded data stream in place of the corresponding decoded data packet. Decoding then continues successively as the encoded data packets are received. When successive encoded data packets have been decoded, they are exported in order to avoid delay in transmission of the decoded data and to reduce the memory storage requirements.

DESCRIPTION OF THE PREFERRED EMBODIMENT

Figure 2:
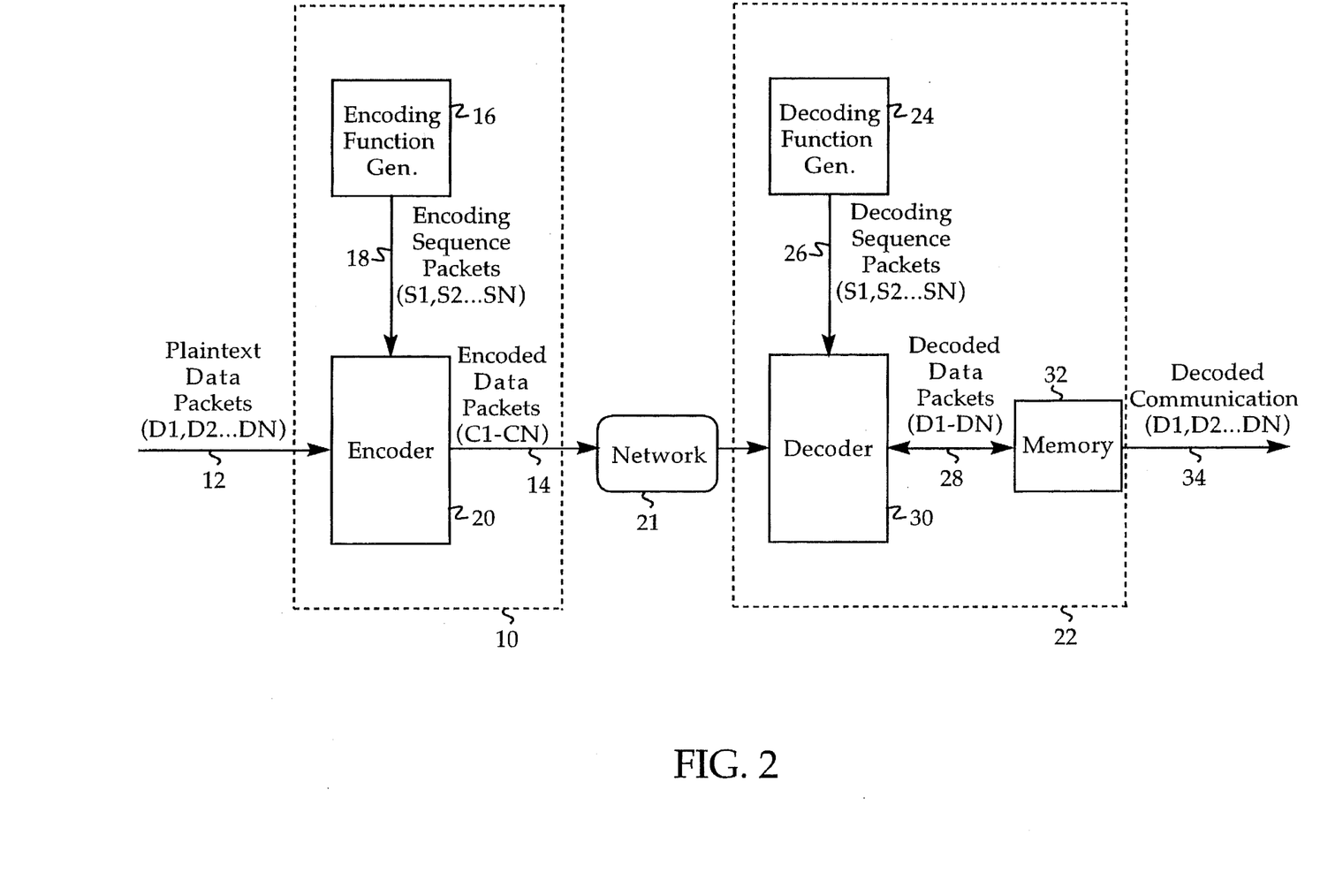
FIG. 2 is a block diagram showing an encoding and decoding system in accordance with the present invention.

Referring now to FIG. 2, a block diagram of an encoding and decoding system in accordance with the present invention is shown. A transmitter 10 encodes plaintext data packets 12 to produce encoded data packets 14. The function of transmitter 10 is to encode the plaintext data packets 12 in such a way that the information is usable only to a receiver having bona fide access to the data. $Plaintext data packets 12 are packets of digital information which may be readily understood by both a sender and a receiver and may also be readily understood by unauthorized third parties having access to the communication channel. Encoded data packets 14 are plaintext data packets 12 that have been encoded and are decipherable only by an authorized receiver. The transmitter comprises an encoding function generator 16 and an encoder 20. The encoding function generator 16 generates encoding sequence packets 18 which are transmitted to the encoder 20. The encoder 20 combines the plaintext data packets 12 and the encoding sequence packets 18 in the encoder 20 preferably by an XOR function. The encoding function introduces a sequence of numbers, codes or equations into the plaintext data packets 12. The combination of encoded sequence packets 18 and plaintext data packets 12 scrambles the plaintext data packets 12 so that they cannot be easily deciphered by an unauthorized receiver. The scrambled plaintext data packets produced by the encoder are the encoded data packets 14.

The encoding function is accomplished by combining the plaintext data 12 with an encoding sequence 18 generated by an encoding function generator 16 within the transmitter 10. Examples of encoding functions are discussed with reference to FIGS. 7 and 8, below. In FIG. 2, a string of plaintext data is divided up into plaintext data packets 12 and transmitted in sequential order to the transmitter 10. An encoding function generator 16 generates a sequence of numbers, codes or equations. The sequence is divided into encoding sequence packets 18. Each encoding sequence packet 18 generated is at least as long as the longest plaintext data packet 12. The encoding sequence packets 18 are transmitted to an encoder 20. The encoder 20 preferably comprises a conventional exclusive-OR (XOR) gate. To encode the data, the encoding sequence packets 18 and plaintext data packets 12 are combined in the encoder 20, and encoded data packets 14 are produced as a result.

The encoded data packets 14 are exported to a receiver 22 through a network 21 in which the individual encoded data packets travel on different paths. The receiver 22 comprises a decoding function generator 24, a decoder 30, and a memory 32. The decoding function generator 24 produces decoding sequence packets 26 that are identical to the encoding sequence packets 18 generated by the transmitter's encoding function generator 16. As the encoded data packets 14 are imported by the receiver 22, the encoded data packets 14 and decoding sequence packets 26 are combined within the decoder 30 preferably by an XOR function. Other functions may be equivalently substituted in place of decoder 30; however, encoder 20 of the transmitter 10 and decoder 30 of the receiver 22 must be invertable functions of each other. The combination of the encoded data packets 14 and the decoding sequence packets 26 results in decoded data packets 28. The decoded data packets 28 are identical to the plaintext data packets 12 originally encoded by the transmitter 10. Upon creation, the decoded data packets 28 are sent to the memory 32. The memory 32 stores the decoded data packets 28 as well as decoding sequence packets 26 for which a corresponding encoded data packet 14 has yet to be received. When a sequence of encoded data packets 14 have been received and decoded, the decoded communication 34 is exported from the memory 32 to an intended receiver. The process continues until all available encoded data packets 14 have been received.

Figure 3A:
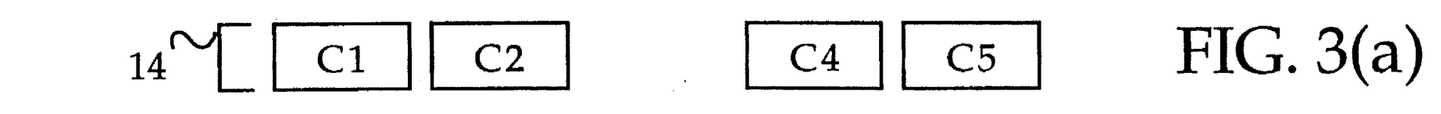
FIG. 3(a) is a diagram showing a stream of encoded data received by the receiver, where a packet is missing.
Figure 3B:
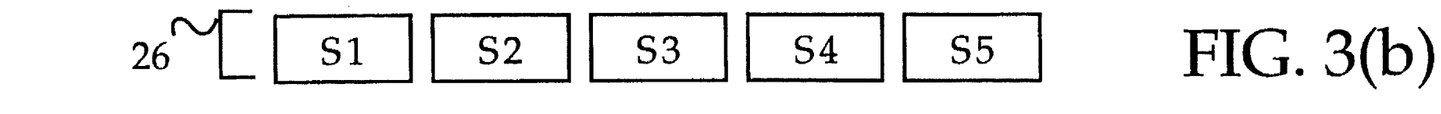
FIG. 3(b) is a diagram showing a stream of decoding sequence packets as generated by the decoding function generator.
Figure 3C:
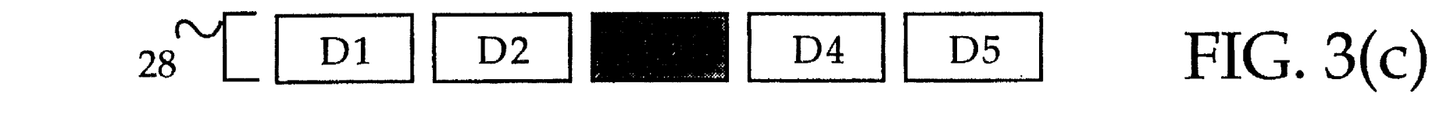
FIG. 3(c) is a diagram showing a stream of decoded data temporarily stored in the memory.

Referring also now to FIG. 3(a)–3(c), FIG. 3(a) is a diagram showing a stream of encoded data packets 14 received by the receiver 22. FIG. 3(b) is a diagram showing a stream of decoding sequence packets 26 as generated by the decoding function generator. FIG. 3(c) is a diagram showing a stream of decoded data 28 temporarily stored in the memory 32. Together, FIGS. 3(a), 3(b) and 3(c) illustrate the production of a stream of decoded data packets 28, where one of a sequence of imported encoded data packets 14 is missing from the data stream. As the encoded data packets 14 (C1 . . . CN) are being imported by the receiver 22, the decoding function generator 24 produces decoding sequence packets 26 (S1, S2 . . . SN) that are transmitted to the decoder 30. As the first encoded data packet C1 is imported, the first encoding sequence packet S1 is generated and combined with the first encoded data packet C1 within the decoder 30. The process of combining a decoding sequence packet 26 with each encoded data packet 14 received, continues until all encoded data packets 14 are received and decoded. The decoded data packets 28 (D1, D2 . . . DN) are stored in the memory 32 in accordance with its arranged position with respect to the sequential order of the decoded data packets. The decoded data packets 28 are then output as decoded communication 34.

Where one of a sequential stream of encoded data packets 14 is missing, the decoding sequence packet 26 corresponding to the missing encoded data packet 14 is stored in the memory 32 in place of the target decoded data packet 28. In the example shown in FIGS. 3(a), 3(b) and 3(c), decoding sequence packet S1 is generated and combined with encoded data packet C1 to produce decoded data packet D1. Likewise, encoded data packet C2 is combined with decoding sequence packet S2 to produce decoded data packet D2. Encoded data packet C3, however, is missing. Nevertheless, decoding sequence packet S3 is generated because the decoding sequence packets 26 must be generated in sequential order. Decoding sequence packet S3 is stored in the memory 32 in place of decoded sequence packet D3, as decoded sequence packet D3 cannot yet be produced. The decoding then continues as encoded data packet C4 is received and combined with decoding sequence packet S4.

When missing encoded data packet C3 is finally received, decoding sequence packet S3 is retrieved from memory 32 and combined with encoded data packet C3. The resulting decoded sequence packet D3 is then stored in memory 32 in sequential order within the decoded data packet 28 stream, and the decoded communication 34 is ready for export to the intended receiver.

Figures 4A, 4B:
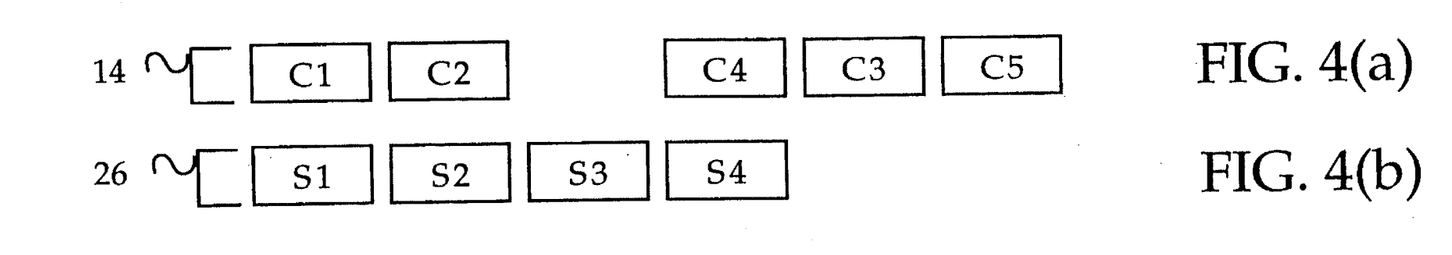
FIG. 4(a) is a diagram showing a stream of encoded data received by the receiver, where a packet is received out of order.
FIG. 4(b) is a diagram showing a stream of decoding sequence packets as generated by the decoding function generator.
Figure 4C:
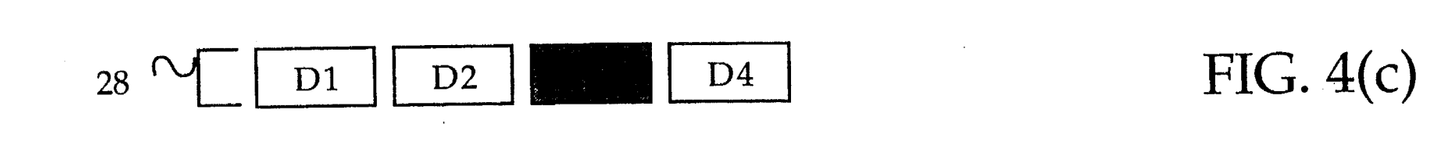
FIG. 4(c) is a diagram showing a stream of decoded data temporarily stored in the memory.

Referring now to FIGS. 4(a)–4(c) is a diagram showing a stream of encoded data packets 14 received by the receiver 22, where an encoded data packet 14 is received out of order. FIG. 4(b) is a diagram showing a stream of decoding sequence packets 26 as generated by the decoding function generator 24. FIG. 4(c) is a diagram showing a stream of decoded data packets 28 temporarily stored in the memory 32. Together, FIGS. 4(a), 4(b) and 4(c) illustrate the production of the decoded data stream where the imported encoded data packets 14 are received non-sequentially, i.e. out of order. As before, the decoding function generator 24 is activated when the first encoded data packet 14 is imported. The decoding sequence packets 26 produced by the function generator 24 are combined with the encoded data packets 14 to produce decoded data packets 28 which are in turn transferred to the memory 32. In the example shown, encoded data packets C1 and C2 are received sequentially, and combined with decoding sequence packets S1 and S2 to produce decoded data packets D1 and D2. Encoded data packet C4 is received before encoded data packet C3.

As the decoding sequence packets 26 are generated in sequential order, decoding sequence packet S3 is generated following decoding sequence packet S2. When the receiver 22 determines that there is no encoded data packet C3 to combine with sequentially generated decoding sequence packet S3, it stores the decoding sequence packet S3 in memory consecutively within the decoded data packet 28 sequence, where decoded data packet D3 would be sequentially stored if it were produced. When encoded data packet C3 arrives following encoded data packet C4, encoded data packet C3 is combined with corresponding decoding sequence packet S3 previously stored in memory.

Decoding efficiency is enhanced because the decoding sequence packet S3 does not have to be regenerated when the missing encoded data packet C3 is received. Since the decoding sequence packet S3 was previously generated, saved sequentially in the memory 32, and is readily available to be combined with the encoded data packet C3, the encoded data 14 is more quickly decoded and the delay associated with having to regenerate the decoding sequence with each non-sequentially received encoded data packet 14 is eliminated. All decoded data packets 28 that are decoded in sequential order from the first encoded data packet to be received, can be transmitted to the intended recipient as soon as they are produced. However, where an encoded data packet 14 is missing, subsequent decoded data packets 28 are retained in the memory 32 until the missing encoded data packet 14 is received. When the missing encoded data packet is received, it is decoded and promptly transmitted to the intended receiver along with the ensuing decoded data packets that are available in sequential order.

Figure 5:
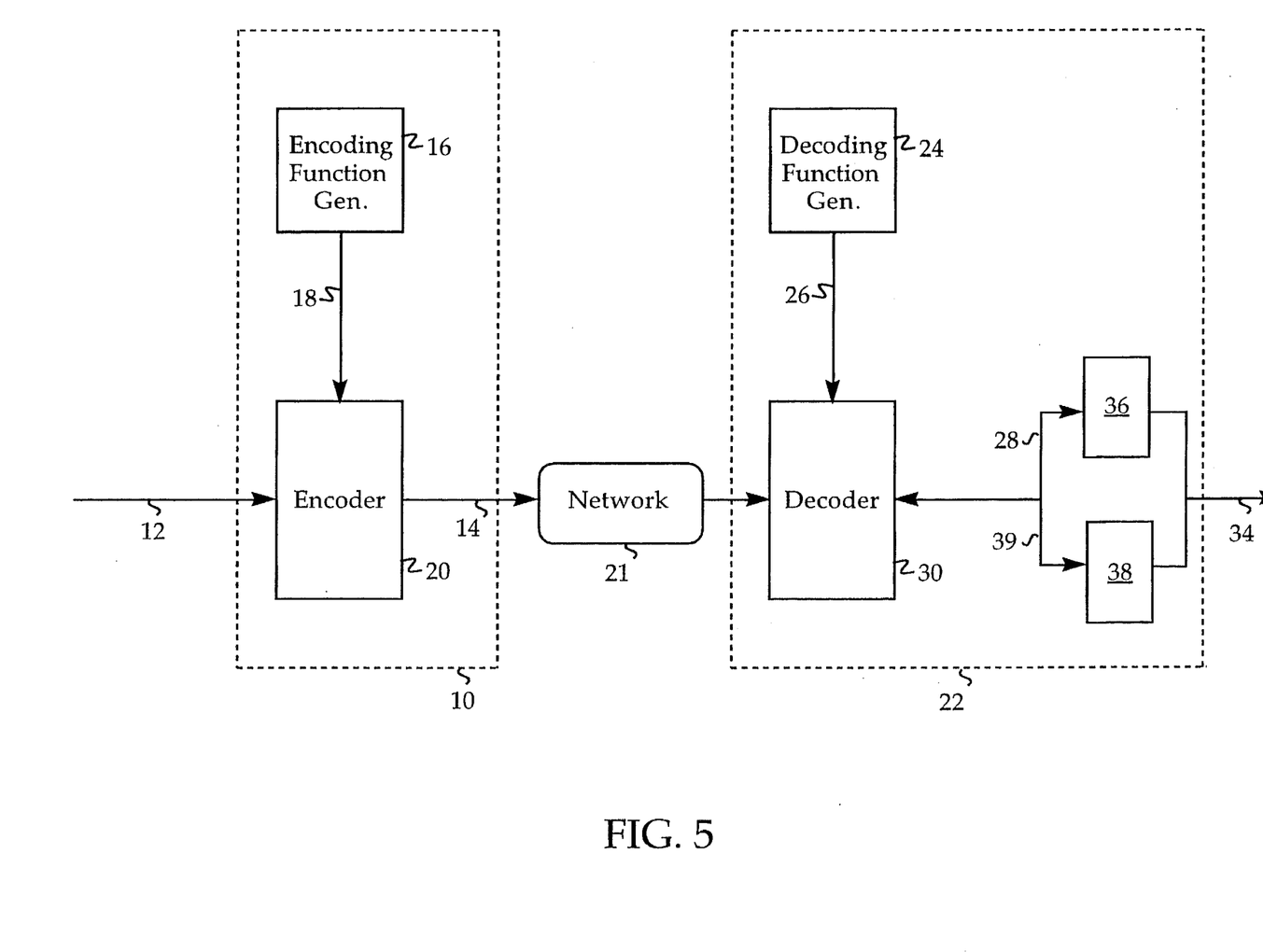
FIG. 5 is an alternative embodiment of the encoding and decoding system illustrated in FIG. 2, where two separate memories are utilized.

Referring now to FIG. 5, an alternative embodiment of the encoding and decoding system of FIG. 2 is shown as having two separate memories. Although a single memory 32 has been discussed, it is also anticipated that a plurality of memories can equivalently be used. For example, a decoded data memory 36 could store the decoded data packets 28 and a separate decoding sequence memory 38 could store the unmatched decoding sequence packets 26. In this way the decoding sequence memory 38 is used as a cache. Where the decoder 30 determines that an encoded data packet 14 is missing from the incoming data stream, the corresponding decoding sequence packet 39 is stored in the decoding sequence memory 38. The decoding sequence memory 38 is scanned for a matching decoding sequence packet 39 each time a subsequent encoded data packet 14 is received. When the missing encoded data packet 14 is later imported, the corresponding decoding sequence packet 39 would be recalled from the decoding sequence memory 38, combined with the encoded data packet 14 within the decoder 30 and the resulting decoded data packet 28 would be stored in the decoded data memory 36 awaiting export to the intended receiver.

Figure 6:
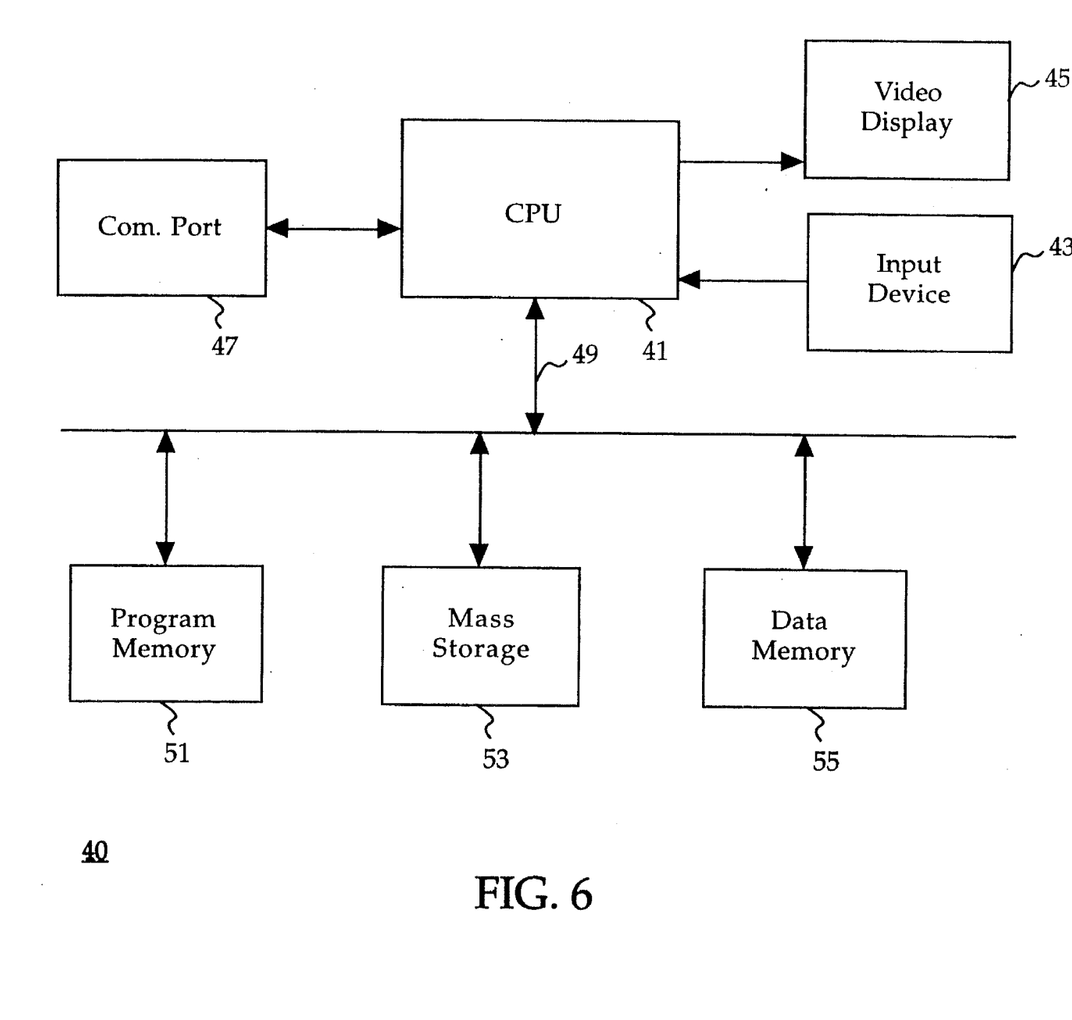
FIG. 6 is a block diagram showing a general purpose computer which is used to implement the encoding and decoding system of the present invention.

Referring now to FIG. 6, a diagram is shown of a general purpose computer 40 used for the preferred implementation of the encoding and decoding system shown in FIG. 2. The preferred implementation of the present invention consists of programmed instructions implemented on an Apple Macintosh® computer, manufactured by Apple Computer, Inc. of Cupertino, Calif. The general method steps, described below, can be equivalently implemented on any general purpose computer and many other programmable processor-based systems.

The general purpose computer 40 consists of a CPU 41 attached to a number of processing components. The CPU 41 contains an input device 43 and a video display 45 through which a user can interact with the CPU 41. The CPU 41 is connected to a communication port 47 for interfacing with other processors and communication devices, such as modems and local area networks. The CPU 41 further comprises a data bus 49 for connecting various memories, including program memory 51, mass storage 53 and data memory 55. Program memory 51 contains operating instructions for directing the control of CPU 41. Mass storage 53 contains stored data that is utilized by CPU 41 in executing program instructions from the program memory 51. Also attached to data bus 49 is data memory 55 which provides storage for unused decoding sequence packets 26 and the retained decoded data packets 28.

Referring also to FIG. 2, the encoder 20 and decoder 30 are implemented by CPU 41 using Boolean arithmetic. The computer 40 can implement the encoding and decoding system in a number of ways. A first computer system can act as a transmitter 10 and export encoded data to a second computer system via the communication port 47. In this operation mode, the first computer acts as transmitter 10 while the second computer acts as receiver 22. This first mode of operation provides for secure transmission of sensitive data.

In an alternative operating mode, a single computer system 40 acts as both a transmitter 10 and as a receiver 22, storing encoded data packets 14 to mass storage 53 and later retrieving the stored encoded data packet 14 for decoding and use. The purpose of this second mode of operation is to allow for the secure storage of sensitive data.

Figure 7:
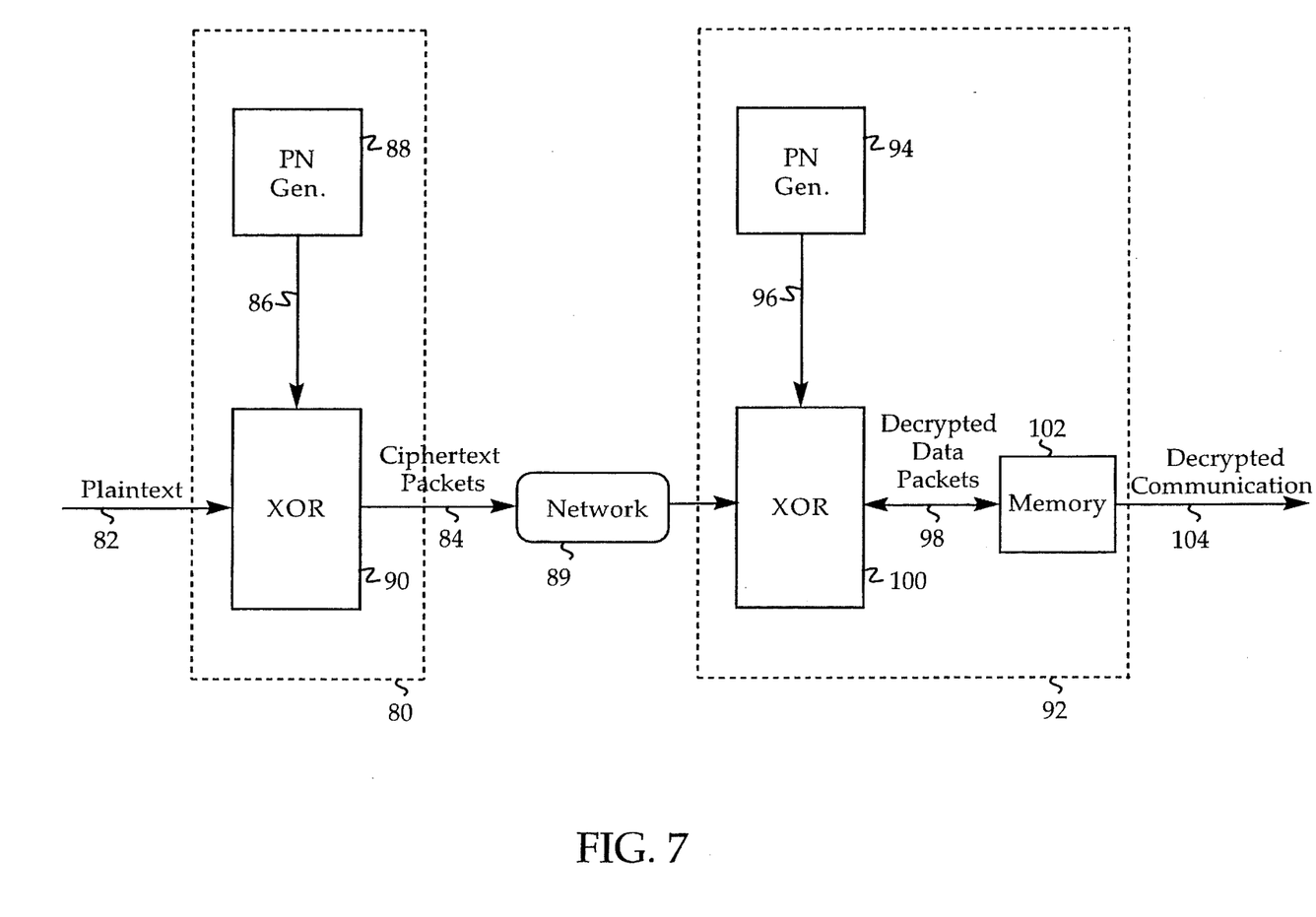
FIG. 7 is a block diagram showing the encoding and decoding system of the present invention in an encryption and decryption embodiment.

Referring now to FIG. 7, an example of an encoding and decoding system in accordance with the present invention is shown in an encryption and decryption scheme embodiment. For examples of such encryption, see related applications 1) Ser. No. 08/110,402 entitled "Method and Apparatus for Variable Overhead Cached Encryption" filed Aug. 23, 1993, and 2) Ser. No. 08/184,978, entitled "Method and Apparatus for Improving the Security of an Electronic Codebook Encryption Scheme Utilizing an Offset in the Pseudorandom Sequence" filed Jan. 21, 1994. Various other logical functions can be equivalently used in place of the XOR gates 90 and 100. See related application Ser. No. 08/193,248, entitled "Method and Apparatus for Improving the Security of an Electronic Codebook Encryption Scheme Utilizing a Data Dependent Encryption Function" filed Feb. 8, 1994.

A transmitter 80 encrypts plaintext data 82 to produce ciphertext 84. A string of plaintext data is divided up into packets 82 and transmitted in sequential order to the transmitter 80. The encoding function is accomplished by combining the plaintext data 82 with a sequence of random numbers generated by a Pseudorandom Number (PN) generator 88 within the transmitter 80. The PN generator 88 within the transmitter 80 generates a unique Pseudorandom Number (PN) packet 86 sequence of binary digits or numbers in response to a seed input. Each PN packet 86 generated is at least as long as the longest plaintext data packet 82 received from the source. The PN packets 86 and plaintext data packets 82 are combined preferably in an XOR gate 90. This combination produces ciphertext packets 84.

The transmitter 80 exports the ciphertext packets 84 through a packet switching network 89 to a receiver 92. The receiver 92 comprises a PN generator 94 that produces PN packets 96 identical to those generated by the transmitter's PN generator 88. Decrypting the ciphertext packets 84 produces decrypted data packets 98 that are identical to the plaintext data packets 82 originally encrypted in the transmitter 80. As the ciphertext packets 84 are imported by the receiver 92, the ciphertext packets 84 and PN packets 96 are combined within the XOR gate 100. Other functions may be equivalently substituted in place of XOR gate 100; however, XOR gate 90 of the transmitter 80 and XOR gate 100 of the receiver 92 must be invertable functions of each other. The combination of the ciphertext packets 84 and the PN packets 96 produces decrypted data packets 98. A data memory 102 is provided for storing PN packets 96 for which a corresponding ciphertext packet 84 has yet to be received, as well as the decrypted data packets 98 output from the XOR gate 100. Decryption continues until all available ciphertext packets 84 have been decrypied. Where ciphertext packets 84 are missing or received non-sequentially, the corresponding PN packet 96 is generated and saved in accordance with the methods discussed in FIGS. 3(a)–3(c) and FIGS. 4(a)–4(c). Decrypted communication 104 is exported from the data memory 102 to an intended receiver.

Figure 8:
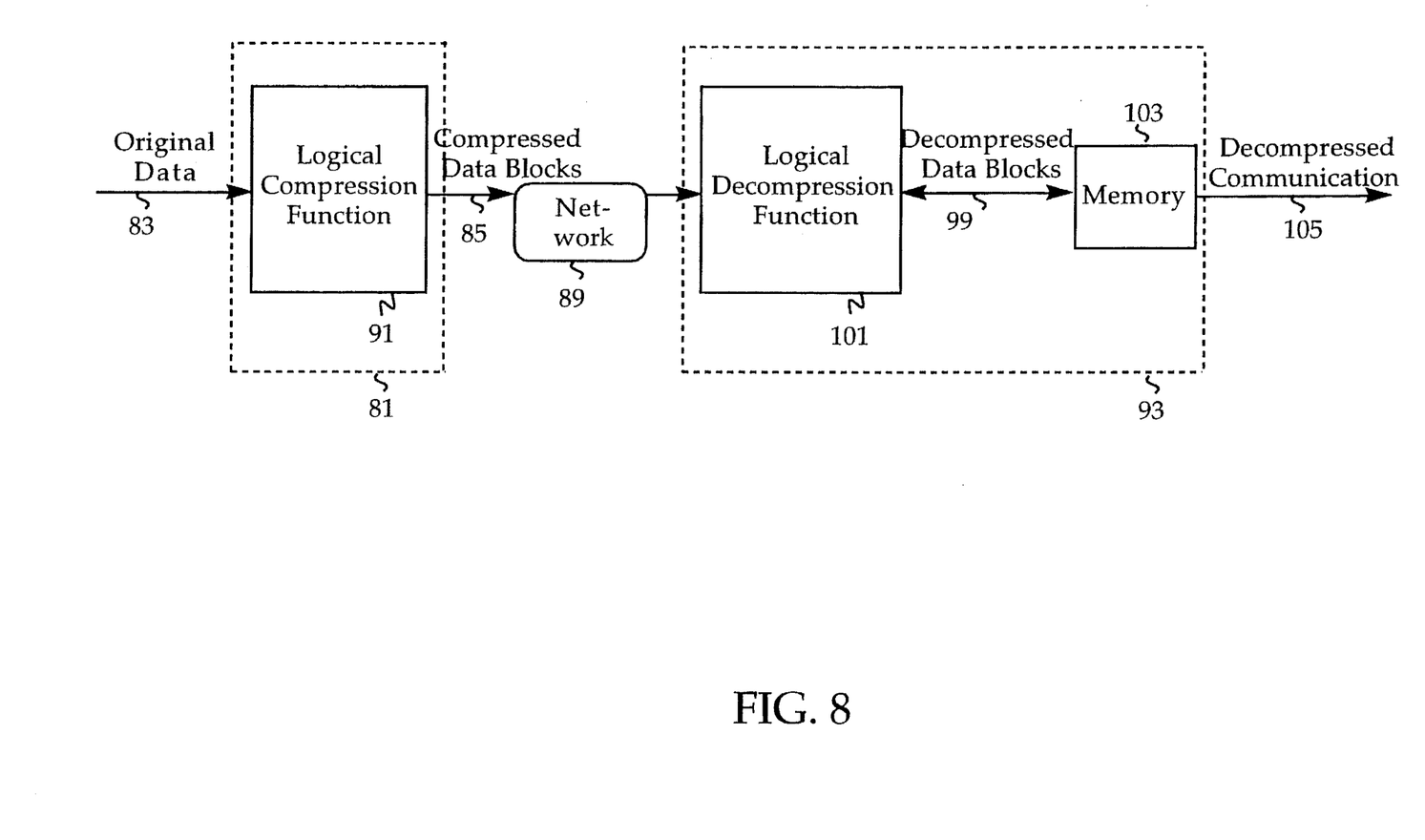
FIG. 8 is a block diagram of an encoding and decoding system in accordance with the present invention in a compression and decompression embodiment.

Referring now to FIG. 8, a block diagram illustrates an encoding and decoding system of the present invention in a compression and decompression embodiment. For streaming mode compression and decompression schemes, the encoding and decoding process of the present invention is similar to that for encryption and decryption. The original data 83 is compressed within the transmitter 81 as it is received in a continuous (unblocked) data stream. Compression equations are applied to the original data 83 by a logical function 91 within the transmitter. The compressed data 85 is divided into blocks and transmitted to a receiver 93 through packet switching network 89.

Decoding of the compressed data blocks 85 begins as the first compressed data block 85 arrives at the receiver 93. A logical decompression function 101 within the receiver 93 applies a decompression equation to the compressed data blocks 85 to produce decompressed data blocks 99. The decompressed data blocks 99 are identical to the full original data 83 prior to compression. The decompressed data blocks 99 are stored in a sequential queue in a receiver memory 103. Where an incoming compressed data block 85 is missing, decompression stops because the decompression function must be performed sequentially. The next compressed data block 85 to be received is saved in compressed form in the receiver memory 103. The compressed data block 85 is stored in the queue of decompressed data blocks 99 in the place reserved for the decompressed data block 99 corresponding to that specific compressed data block 85. All ensuing compressed data blocks 85 are stored in this manner until the previously missing compressed data block 85 is received. When the previously missing compressed data block 85 is received, it is decompressed. The rest of the saved compressed data blocks 85 can then be retrieved from the receiver memory 103 and decompressed accordingly. The decompressed communication 105 is then transmitted to an intended receiver.

Figure 9:
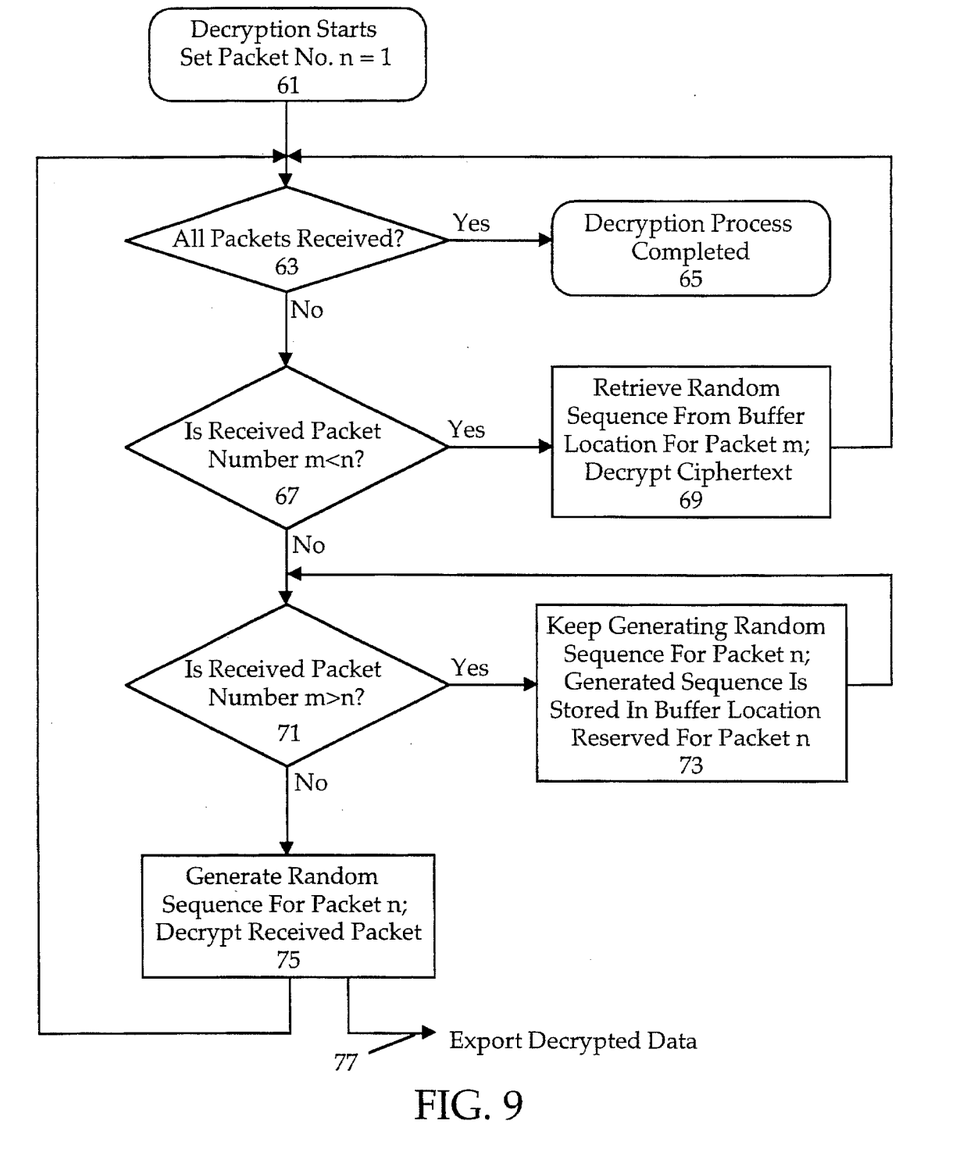
FIG. 9 is a How diagram showing the method steps of decrypting data using the apparatus of FIG. 7.

Referring now to FIG. 9, a flow diagram is shown outlining the decoding process in accordance with the present invention, utilizing the decryption scheme of FIG. 7 as an example. The process is comprised of programmed instruction steps which are executed by the general purpose computer 40, acting in the mode of a receiver 92 in decrypting ciphertext packets 84 to produce plaintext data packets 82. Step 61 is the entry point for the decrypting instructions of FIG. 7. In step 61, the first ciphertext packet 84 to be received is assigned a beginning decryption sequence identifier (ID) number. All subsequently received ciphertext packets 84 are given decryption sequence identifying numbers in accordance with:

$$n = n + 1$$

If the CPU 41 determines 63 that all available ciphertext packets 84 have been received, the decryption process is complete 65. If not all ciphertext packets 84 have been received, the CPU 41 determines 67 whether the ciphertext packet 84 number of the next incoming ciphertext packet 84 is less than the next subsequent decryption sequence ID number. If the ciphertext packet 84 number of the next incoming ciphertext packet 84 is less than the next subsequent decryption sequence ID number, the corresponding PN packet 96 has already been generated by the PN generator 94 and is stored in the data memory 102 location for the decrypted data packet 98 associated with the missing ciphertext packet 84. The PN packet 96 is retrieved 69 from the data memory 102 and combined with the ciphertext packet 84 to produce a corresponding decrypted data packet 98. The CPU 41 then reverts to step 63 and determines whether more ciphertext packets 84 are available for decrypting.

If, however, in step 67, the next incoming ciphertext packet number is not less than the current decryption sequence ID number, the CPU 41 will determine 71 whether the next incoming ciphertext packet 84 number is greater than the current decryption sequence ID number. If the next incoming ciphertext packet 84 number is greater than the current decryption sequence ID number, the PN generator 94 continues to generate 73 PN packets 96 for matching and combining with the incoming ciphertext packets 84. Any PN packets 96 generated but not matched to a corresponding ciphertext packet 84 are stored in the data memory 102. Where the CPU 41 determines that the ciphertext packet 84 number equals the current decryption sequence ID number, the next sequential PN packet 96 is generated 75 and combined with the next incoming ciphertext packet 84 and the corresponding plaintext data 82 is decrypted.

By using a data memory 102 for storing unused PN packets 96, the receiver 92 does not expend the overhead of repeatedly recreating the stream of PN packets 96 in order to decode the nonsequential ciphertext packet 84. If the PN packet 96 is found in the data memory 102, then the decryption of the corresponding ciphertext packet 84 is relatively fast and the sequentially ordered decrypted data packets 98 can be exported 77 as they are produced.

Figure 10A:
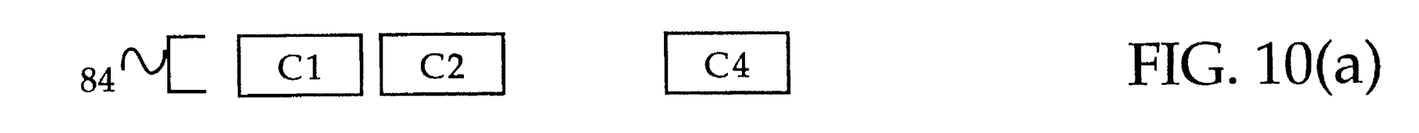
FIG. 10(a) is a diagram showing a stream of encoded data received by the receiver, where a packet is missing from the sequential order.
Figure 10B:
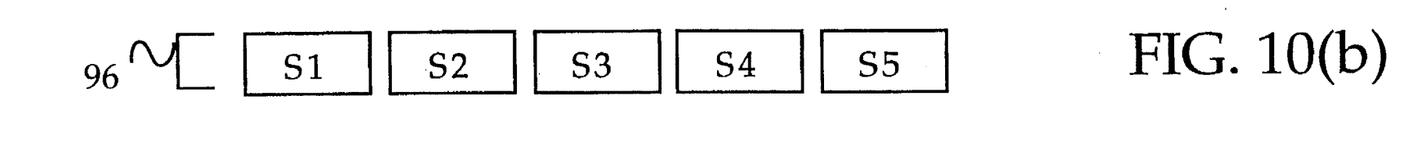
FIG. 10(b) is a diagram showing a stream of decoding sequence packets as generated by the decoding function generator.
Figure 10C:
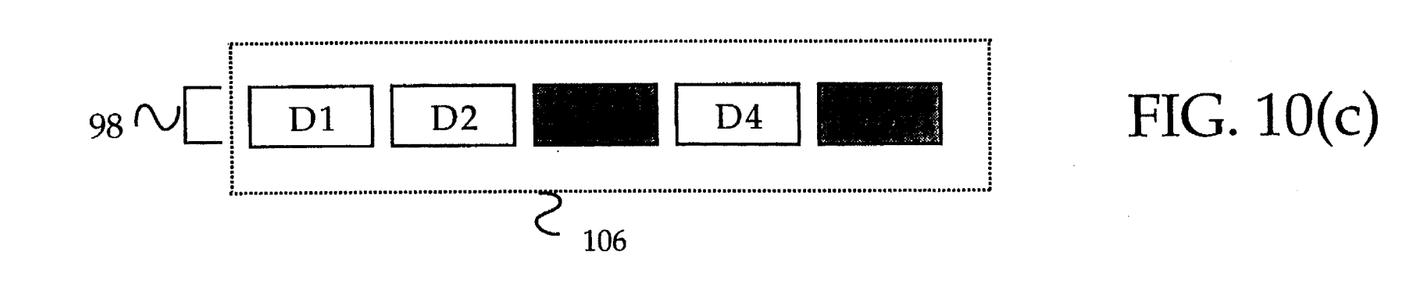
FIG. 10(c) is a diagram showing a stream of decoded data temporarily stored in the memory.

Referring now to FIGS. 10(*a*)–10(*c*), FIG. 10(*a*) is a diagram showing a stream of encrypted ciphertext packets 84 received by the receiver 92, where packets C3 and C5 are missing from the sequential order. FIG. 10(*b*) is a diagram showing a stream of PN packets 96 as generated by the PN generator 88. FIG. 10(*c*) is a diagram showing a stream of decrypted data packets 98 temporarily stored in the data memory 102. Together, FIGS. 10(*a*), 10(*b*) and 10(*c*) illustrate the production of a decrypted communication stream 104 in accordance with an alternative embodiment of the present invention. Referring also to FIG. 7 to again use the encryption and decryption scheme for example purposes, the transmitter 80 preferably informs the receiver 92 how many ciphertext packets 84 are to follow before any ciphertext packets 84 are exported from the transmitter 80 to the receiver 92. The receiver's PN generator 94 then generates an equal amount of PN packets 96. The PN packets 96 are cached in a PN packet memory 106 before the first ciphertext packet C1 is imported. In this embodiment, the ciphertext packets 84 can be imported out of sequence without causing a delay in their decryption. As each ciphertext packet 84 is received, it is matched with a corresponding PN packet 96 from the PN packet memory 106. The ciphertext packet 84 and corresponding PN packet 96 are combined in the XOR gate 100 and the plaintext data 82 is decoded.

In the conventional system, decoding can only begin after all the ciphertext packets 84 have been received. In contrast, the embodiment of FIGS. 10(*a*)–10(*c*) allows decoding as each ciphertext packet 84 is received, eliminating the delay in the export of the decrypted communication 104 associated with the conventional approach. FIG. 10(*a*) shows a stream of ciphertext packets 84 being transmitted with packets C3 and C5 missing. As all of the PN packets 96 reside in the PN packet memory 106, the imported ciphertext packets 84 are decrypted as each one is received. The decrypted data packets 98 are saved in sequence in the PN packet memory 106, replacing their corresponding PN packet 96. The result is a string of decrypted data packets 98 including PN packets 96 in the places where a corresponding ciphertext packet 84 is yet to be received. When the missing ciphertext packet 84 is imported, the missing ciphertext packet 84 is compared with the PN packets 96 still available in the data memory 102. The missing ciphertext packet 84 is then combined with the appropriate PN packet 96, and the resultant decrypted data packet 98 is stored sequentially within the stream of decrypied communication 104.

Although the alternative embodiment has been described where the receiver 92 is informed in advance of the quantity of ciphertext packets 84 forthcoming, the receiver 92 need not know the quantity of imported ciphertext packets 84 ahead of time. Where the receiver 92 does not know how many ciphertext packets 84 to expect, the receiver's PN generator 94 can generate a predetermined number of PN packets 96 as a group. The first ciphertext packet 84 in excess of the predetermined number of PN packets 96 to be imported triggers the PN generator 94 to generate another group of PN packets 96. This method provides that the generation of the PN packets 96 is a background task, and does not interrupt the efficient decryption of imported ciphertext packets 84.

The invention has now been explained with reference to specific embodiments. Other embodiments will be apparent to those of ordinary skill in the art in light of this disclosure. For example, the invertable function described in the preferred embodiment is an XOR function. Other invertable functions are equivalently effective. Also the function n=n+1 is shown as a sequential identification number. Alternative functions to sequentially identifying incoming ciphertext packets are viewed as equivalents with respect to the present invention. Therefore, it is not intended that this invention be limited, except as indicated by the appended claims.

What is claimed is:

1. An apparatus for decoding sequentially encoded data packets, said packets being received in an unspecified order, the apparatus comprising:
   a decoder having a first input for receiving the encoded data packets arriving in an unspecified order, and a second input for receiving sequentially generated decoding data, said decoder defining a correspondence between the sequentially encoded data packets and the sequentially generated decoding data, and combining each received encoded data packet with corresponding decoding data to produce a decoded data packet; and
   at least one memory coupled to the decoder, the memory containing the decoded data packets corresponding to encoded data packets which have been received and combined by the decoder, and the memory further containing decoding data received by the decoder and waiting to be combined with corresponding as-yet-unreceived encoded data packets.

2. The apparatus according to claim 1 further including a decoding function generator connected to the decoder that provides and outputs the decoding data to the decoder.

3. The apparatus according to claim 2 wherein the decoding function generator provides a decoding function that is the inverse of an encoding function used to produce the encoded data.

4. The apparatus according to claim 3 wherein the decoder is an exclusive-OR gate.

5. The apparatus according to claim 1 wherein the decoding data is divided into packets.

6. The apparatus according to claim 1 further including a transmitter connected to the decoder that provides and outputs the encoded data packets to the decoder.

7. The apparatus according to claim 1 wherein the memory comprises a first memory section for storing the decoding data and a second memory section for storing the decoded data packets.

8. The apparatus according to claim I wherein the decoding of the encoded data comprises decrypting encrypted data to produce plaintext data identical to the plaintext data originally encrypted.

9. The apparatus according to claim 1 wherein the decoding of the encoded data comprises decompressing compressed data.

10. An apparatus for decoding sequentially encoded data packets, said packets being received in an unspecified order, the apparatus comprising:
    means for receiving encoded data packets, arriving in an unspecified order;
    a decoding data .generator providing sequentially generated decoding data and defining a correspondence between the sequentially encoded data packets and the sequentially generated decoding data;
    means for storing generated decoding data corresponding to as-yet-unreceived encoded data packets for use in decoding encoded data packets received after the .generation of the corresponding decoding data.

11. The apparatus according to claim 10 for decoding encoded data packets further comprising means for storing the decoded data packets received out of the sequential encoding order.

12. The apparatus according to claim 11 for decoding encoded data packets in which the decoded data packets and the generated decoding data are stored in separate means for storing.

13. The apparatus according to claim 10 for decoding encoded data packets, in which the decoding data is generated according to a decoding function.

14. A method for decoding sequentially encoded data packets, said packets being received in an unspecified order, comprising the steps:
    receiving encoded data packets, arriving in an unspecified order;
    receiving decoding data defining a sequence corresponding to the sequentially encoded data packets;
    decoding received encoded data packets for which the corresponding decoding data has been received; and
    storing received decoding data corresponding to as-yet-unreceived encoded data packets.

15. The method according to claim 14 for decoding encoded data packets, in which following the step of decoding received encoded data packets, the method further comprises the step of storing the decoded data packets.

16. The method according to claim 15 for decoding encoded data packets, in which the decoded data packets and the generated decoding data are stored in separate memories.

17. The method according to claim 14 for decoding encoded data packets, in which prior to the step of receiving decoding data defining a sequence corresponding to the sequentially encoded data packets, the method further comprises the step of sequentially generating the decoding data according to a decoding function.

18. The method according to claim 17 for decoding encoded data packets, in which the decoding function is the inverse of an encoding function used to produce the encoded data.

* * * * *